(12) United States Patent
Kumar et al.

(10) Patent No.: US 8,590,026 B2
(45) Date of Patent: Nov. 19, 2013

(54) METHOD AND SYSTEM FOR GENERATING A TOUCH CAPTCHA

(75) Inventors: R. Sravan Kumar, Andhra Pradesh (IN); Ashutosh Saxena, Andhra Pradesh (IN)

(73) Assignee: Infosys Limited (IN)

( * ) Notice: Subject to any disclaimer, the term of this patent is extended or adjusted under 35 U.S.C. 154(b) by 160 days.

(21) Appl. No.: 13/179,641

(22) Filed: Jul. 11, 2011

(65) Prior Publication Data

US 2012/0254964 A1  Oct. 4, 2012

(30) Foreign Application Priority Data

Mar. 31, 2011  (IN) .............. 1063/CHE/2011

(51) Int. Cl.
- *H04L 9/32* (2006.01)
- *G06F 15/16* (2006.01)
- *G06F 21/00* (2013.01)
- *G06F 12/14* (2006.01)

(52) U.S. Cl.
USPC ............. 726/7; 726/17; 713/170; 713/189

(58) Field of Classification Search
USPC ............ 726/7, 21, 27, 28, 17; 715/700, 863; 345/173, 156; 713/170, 189
See application file for complete search history.

(56) References Cited

U.S. PATENT DOCUMENTS

| | | | | |
|---|---|---|---|---|
| 7,721,107 B2 * | 5/2010 | Golle et al. | ............ | 713/184 |
| 8,060,916 B2 * | 11/2011 | Bajaj et al. | ............ | 726/3 |
| 8,214,891 B2 * | 7/2012 | Seacat | ............ | 726/17 |
| 8,307,407 B2 * | 11/2012 | Jakobsson et al. | ............ | 726/2 |
| 2010/0229223 A1 * | 9/2010 | Shepard et al. | ............ | 726/5 |
| 2011/0162067 A1 * | 6/2011 | Shuart et al. | ............ | 726/19 |
| 2011/0209076 A1 * | 8/2011 | Saxena et al. | ............ | 715/764 |

OTHER PUBLICATIONS

Shirali-Shahreza, M., "Highlighting CAPTCHA" Human System Interactions, 2008 Conference on; May 25-27, 2008. pp. 247-250 [retrieved from IEEE database on Dec. 17, 2012].*

* cited by examiner

*Primary Examiner* — Aravind Moorthy
*Assistant Examiner* — Shu Chun Gao
(74) *Attorney, Agent, or Firm* — Cantor Colburn LLP

(57) ABSTRACT

The present invention provides a method and system for automated test for human presence at a client device capable of receiving touch sensitive response. At a server, the method includes receiving and storing user profile information. Receiving request from client device to access a resource on a server. Generating a query based on the user profile information and the query requiring user to generate a touch sensitive response. Receiving the user generated response and authenticating the user if the touch sensitive response matches a predefined response for the query stored on the server.

23 Claims, 5 Drawing Sheets

METHOD AND SYSTEM FOR GENERATING A TOUCH CAPTCHA

BACKGROUND

The invention relates generally to the field of testing human presence at a computing device. In particular, the invention relates to a method and system for testing human presence using touch enabled devices.

CAPTCHA, or "Completely Automated Public Turing Test to tell Computers and Humans Apart" (also known as Turing test) has been used in the field of human computer interaction to verify the presence of a human user when an access to a remote resource is required. Without these programs to test human presence, web sites are at the risk of Distributed Denial of Service (DDoS) attacks and spam. Typically, DDoS occurs when an access to a resource on a server takes place by automated means and simultaneous access is sought by multiple clients. Spam happens when automated programs called "bots" fill web forms that are meant for registration or sign up for the web site, which creates fake users for the web site. As may be apparent, such attacks are undesirable.

CAPTCHA tests involving the use of randomized typography or distorted characters have been in use for web sites on the Internet. These CAPTCHAs have not been very effective, since optical character recognition (OCR) technology is constantly improving, and thereby enabling spammers to predict the randomized typography that was used for CAPTCHA tests. Spammers could therefore answer the CAPTCHA tests by automated means and cause DDoS attacks and spam web sites. Accordingly, there is a need for new methods of CAPTCHA other than randomizing typographical elements to test human presence at a client device.

The advance in input mechanisms has led to a proliferation of touch enabled devices capable of receiving touch input as a primary means to operate the device. As such, there is a need for new methods of generating CAPTCHA tests that can be presented on these touch enabled devices and also take advantage of the capabilities of touch based devices.

While there are methods of generating CATPCHAs that exist for touch enabled devices, problems such as users facing tests that are difficult to solve or that involve complex touch operations still exist. Even though such tests could decrease the success rate of automated programs from automatically answering CAPTCHA test, it is important to consider the difficulty posed to the human users while simultaneously keeping the CAPTCHA tests difficult for automated programs to solve.

SUMMARY OF THE INVENTION

According to the present invention, a method and system for generating CAPTCHA tests suitable for touch enabled devices to overcome the disadvantages that exist in the prior art are disclosed.

The present invention relates to a computer implemented method for generating a completely automated test for human presence, which uses user profile information. The method includes receiving user profile information at a server. The method further includes receiving a request for accessing a resource on the server, from a client device. Further, the method includes generating a query based on the user profile information, wherein the query is displayed on a touch sensitive display area of the client device. The generated query requires a touch sensitive response on the touch sensitive display area of the client device. Subsequently, the touch sensitive response generated by the client device is received and the user is authenticated if the touch sensitive response generated by the user matches a predefined response for the query stored on the server.

The present invention relates to a system for generating a completely automated test for human presence, which uses user profile information. The system includes a client device having a touch sensitive display area. The touch sensitive display area is capable of displaying the query and receiving touch response from a user. The system also includes a server connected to the client device over a network. The server includes a storage module, a query generation module and an authentication module. The storage module stores user profile information. Based on the user profile information, the query generation module generates a query for the user accessing the client device. The authentication module compares the touch sensitive response from the client device with a predefined response computed and/or stored on the server for that query.

DRAWINGS

These and other features, aspects, and advantages of the present invention will be better understood when the following detailed description is read with reference to the accompanying drawings in which like characters represent like parts throughout the drawings, wherein.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

Figure 1:
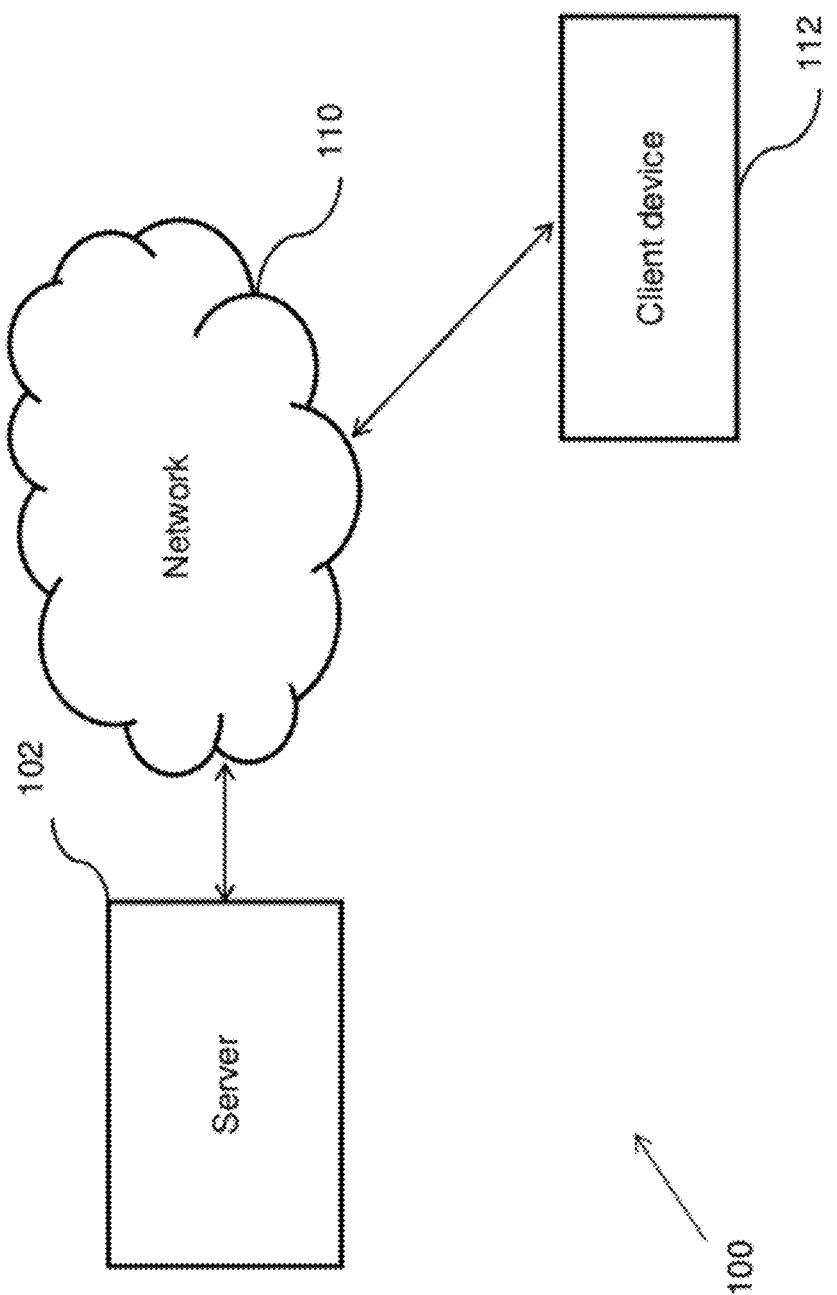
FIG. 1 shows an environment 100 in which the present invention can be practiced, in accordance with an embodiment.

FIG. 1 shows an environment 100 in which the present invention can be practiced, in accordance with an embodiment. Environment 100 includes a server 102, a network 110 and a client device 112.

Server 102 stores and generates queries to test human presence at client device 112. Client device 112 may be a portable communications device having a display capable of showing the query to the user visually and receiving a touch response from the user. Server 102 receives a request to access a resource on server 102 from client device 112 through network 110. In response to the request, server 102 generates a query and sends the query to client device 112. User response received at the client device 112 is transmitted to server 102 for authentication.

In accordance with various embodiments of the present invention, server 102 stores and executes programs and data that are used to generate queries upon a request to access a resource by client device 112. Examples of network 110 include, but are not limited to, any data transmission media, such as a wide area network, a local area network, and a wireless network. Examples of client device 112 include, but are not limited to, touch-enabled smart phones and cellular phones.

Figure 2:
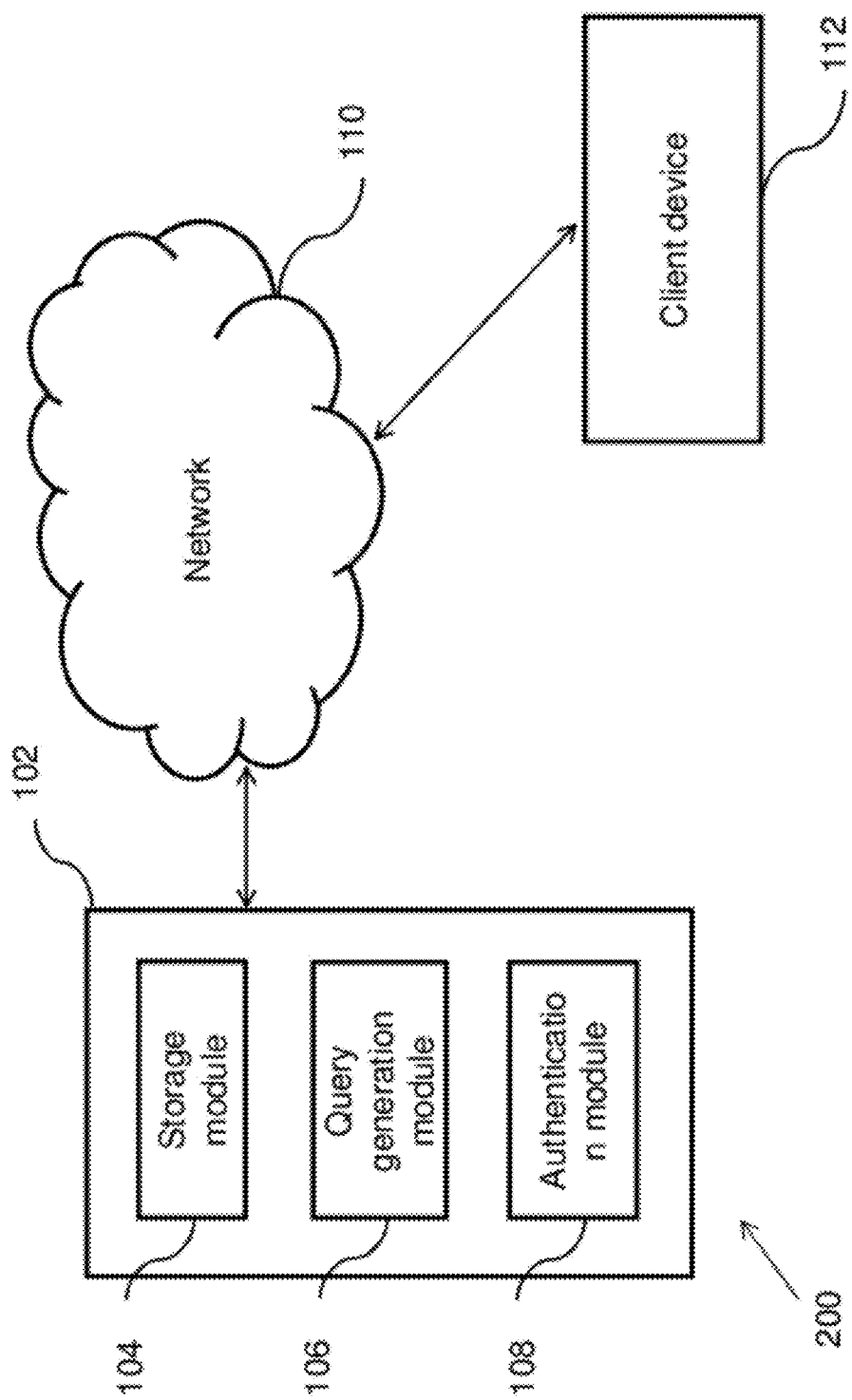
FIG. 2 shows an environment 200 in which the present invention can be practiced, in accordance with an embodiment.

FIG. 2 shows an environment 200 in which the present invention can be practiced, in accordance with an embodiment. Environment 200 includes a server 102, a network 110 and a client device 112. Server 102 includes a storage module 104, a query generation module 106 and an authentication module 108.

As explained earlier in conjunction with FIG. 1, server 102 stores and generates queries to test human presence at client device 112. Storage module 104 stores user profile information. It should be noted that the user profile information is obtained from the user when the user requires access to any resource on server 102 for the first time. User profile information may be obtained during the sign up or registration of the user or at the time of accessing the resources, and in an embodiment, is a one-time process.

In accordance with an embodiment of the present invention, faculties may be defined as powers or capacities possessed by human mind. Examples of such faculties of the user may include, but are not limited to, the ability to read languages, the ability of the user's eye to recognize colors and educational qualification information.

Query generation module 106 is invoked upon the request to access a resource on server 102 by client device 112. Query generation module 106 generates a query based on the user profile information stored in storage module 104. That is, the query is so generated that it matches the faculties of the user. This query is then sent to client device 112 for the user to input a response through the touch sensitive display.

In accordance with various embodiments of the present invention, query generation module 106 generates the query when client device 112 requests for a resource on server 102. Examples of a resource may include, but are not limited to a file, a directory containing files, a virtual private network domain, and the like. Example of queries may include, but are not limited to, instructing the user to follow a curve by tracing the path of a two dimensional curve displayed on the touch sensitive display, showing objects of various colors on the touch-sensitive display and asking the user to touch an object of a particular color, showing a map and asking the user to touch a particular region on the map, asking the user to draw a particular figure or a shape, such as a circle, a question mark and so forth, displaying a sentence and asking the user to input a particular word occurring in the sentence, displaying a map of a country and asking the user to write the name of the country, displaying a question and asking the user to input the answer to the question, and the like. It should be noted that the above examples are merely illustrative of different types of queries that may be generated. Further, as was explained earlier, the query generated is based on the user profile information stored at server 102.

Authentication module 108 is invoked when the response for the query sent from the client device to the server is received on the server. As used herein, authentication is the process of verifying the identity of a user accessing client device 112. Once authentication module 108 authenticates the user, the user is granted access to the resource on server 102. Authentication module 108 compares the response provided by the user through client device 112 with a predefined response stored in storage module 104. When the response of the user matches the predefined response stored in storage module 104, authentication module 108 authenticates the user to access the resource on server 102. In accordance with an embodiment, a range may be defined for every query and the user is granted access to the resource as long as the response provided by the user falls within the predefined range. For example, if a query asks the user to draw a circle on the touch-sensitive display, an allowed deviation in the response to this query may be defined and stored at server 102.

Figure 3:
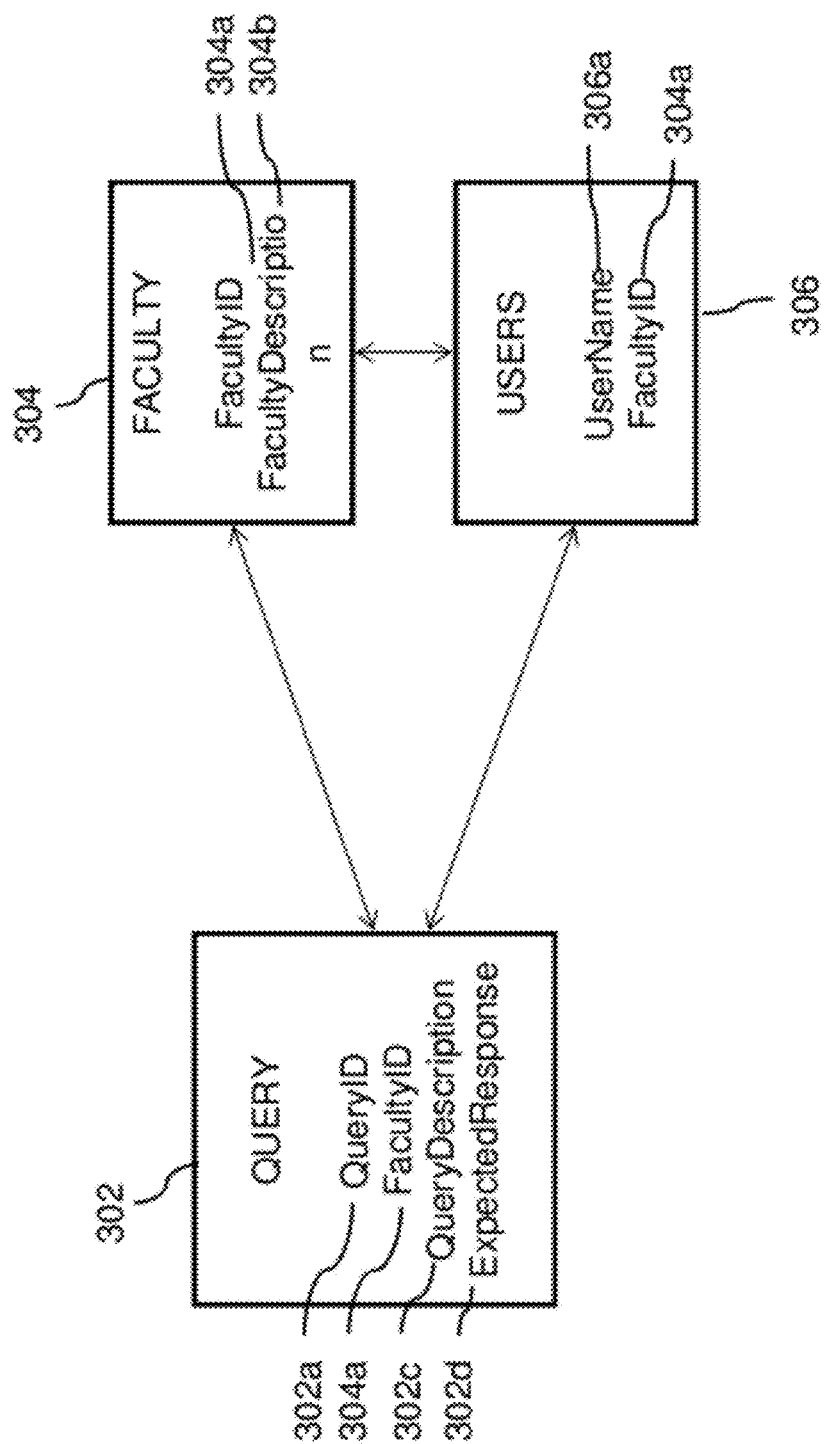
FIG. 3 shows a diagram detailing the database tables that are used by an embodiment of the present invention.

FIG. 3 is a block diagram illustrating the database tables that may be used, in accordance with an embodiment of the present invention. FIG. 3 includes a query table 302, a faculty table 304 and a users' table 306.

Query table 302 includes information that is required to generate a query. Query table 302 includes the following fields: QueryID 302*a*, which uniquely identifies a query, FacultyID 304*a*, which is the faculty corresponding to the query that has a corresponding entry in faculty table 304, QueryDescription 302*c*, which is a description of the query that is to be sent to a client device, such as client device 112, ExpectedResponse 302*d*, which is a predefined response expected from client device 112. Faculty table 304 includes faculty information. Faculty table 304 includes fields FacultyID 304*a*, which is the primary key uniquely representing each faculty applicable to users. FacultyDescription 304*b* provides a description of each of the faculties corresponding to FacultyID 304*a*. Users' table 306 stores faculty information corresponding to a particular user. Users' table 306 contains two fields, namely, UserName 306*a* which is the primary key for this table and uniquely represents the user of a web application or a software application. The FacultyID 304*a* corresponding to each unique user is stored in the users table 306. In accordance with an embodiment, query table 302, faculty table 304 and users' table 306 are a part of storage module 104 and store user profile information.

Figure 4:
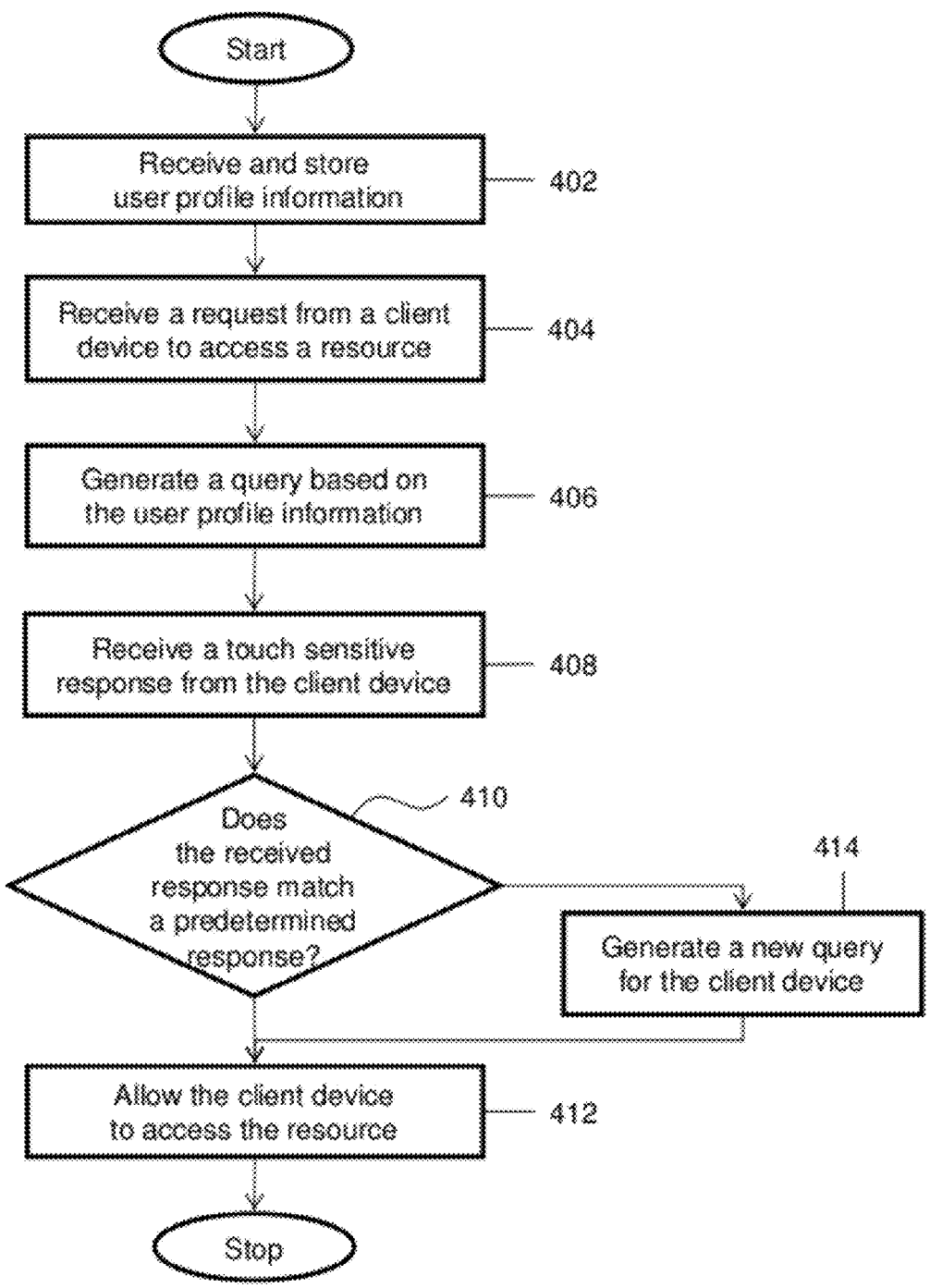
FIG. 4 represents a flowchart describing the process involved in an embodiment.

FIG. 4 is a flowchart illustrating a method for generating a CAPTCHA test, in accordance with an embodiment of the present invention.

At step 402, user profile information is received at a server, such as server 102, from a user. The user profile information is stored at the server in the form of tables, as explained earlier in conjunction with FIG. 3.

At step 404, a request is received at the server from a user accessing a client device, such as client device 112, having a touch sensitive display, to access a resource on the server.

At step 406, a query is generated by the server based on the user profile information and sent to the client device.

At step 408, a touch sensitive response is received at the server from the user accessing the client device.

At step 410, it is determined whether the response received from the client device matches the predetermined response stored at the server.

If the response received from the client device matches the predetermined response, at step 412, the server allows the user to access the resource on the server.

However, if the response received from the client device does not match the predetermined response, at step 414, the server does not allow the user to access the resource on the server. In accordance with an embodiment, the server generates a new query for the user when the response received from the client device does not match the predetermined response stored at the server. Further, in case the server receives an incorrect response for a predefined number of times from the user, the server may not generate new queries and may block the user (or the client device) from accessing the resource.

Exemplary Computing Environment

Figure 5:
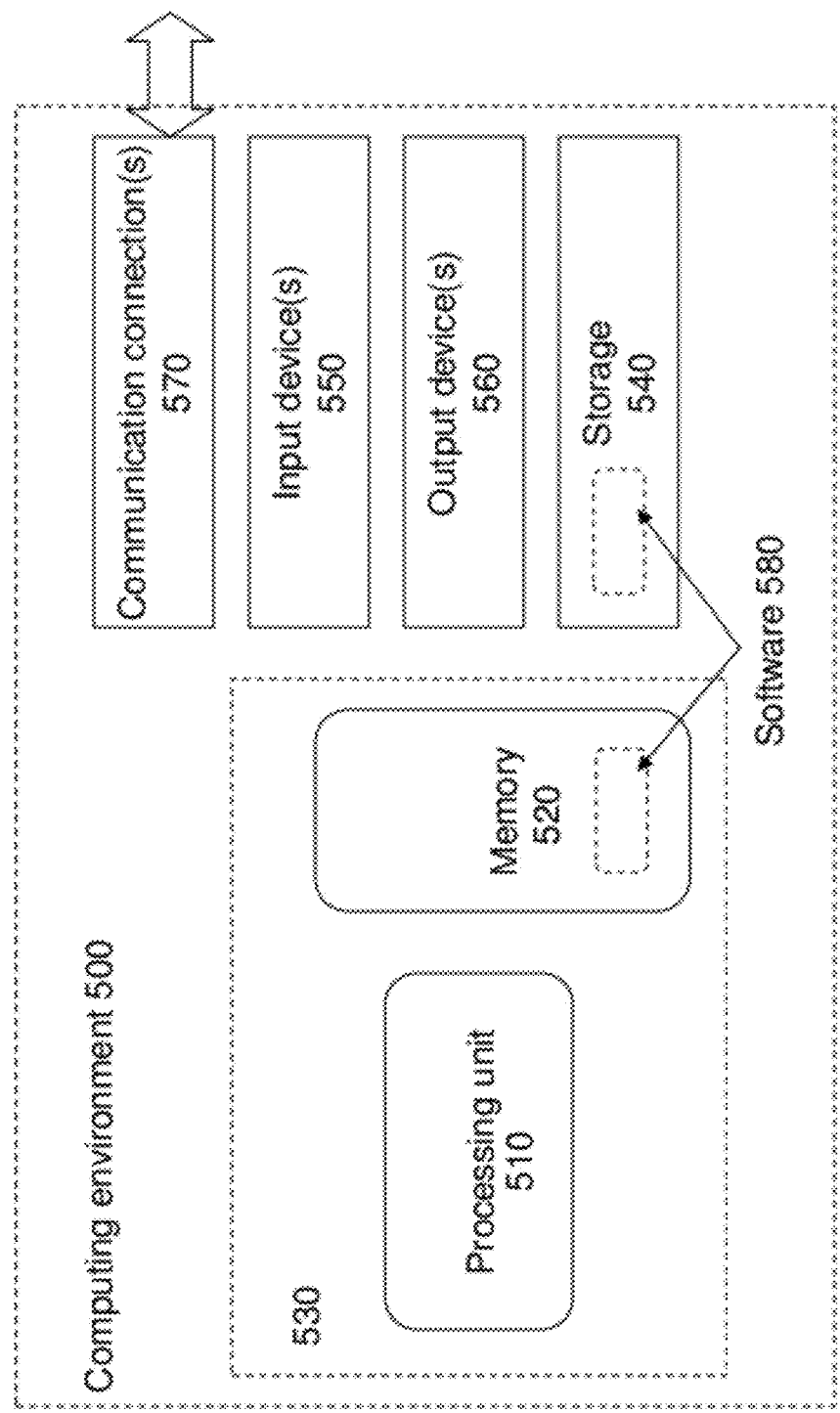
FIG. 5 illustrates a generalized example of a computing environment 500.

One or more of the above-described techniques can be implemented in or involve one or more computer systems. FIG. 5 illustrates a generalized example of a computing environment 500. The computing environment 500 is not intended to suggest any limitation as to scope of use or functionality of described embodiments.

With reference to FIG. 5, the computing environment 500 includes at least one processing unit 510 and memory 520. In FIG. 5, this most basic configuration 530 is included within a dashed line. The processing unit 510 executes computer-executable instructions and may be a real or a virtual processor. In a multi-processing system, multiple processing units execute computer-executable instructions to increase processing power. The memory 520 may be volatile memory (e.g., registers, cache, RAM), non-volatile memory (e.g., ROM, EEPROM, flash memory, etc.), or some combination of the two. In some embodiments, the memory 520 stores software 580 implementing described techniques.

A computing environment may have additional features. For example, the computing environment 500 includes storage 540, one or more input devices 550, one or more output devices 560, and one or more communication connections 570. An interconnection mechanism (not shown) such as a bus, controller, or network interconnects the components of the computing environment 500. Typically, operating system software (not shown) provides an operating environment for other software executing in the computing environment 500, and coordinates activities of the components of the computing environment 500.

The storage 540 may be removable or non-removable, and includes magnetic disks, magnetic tapes or cassettes, CD-ROMs, CD-RWs, DVDs, or any other medium which can be used to store information and which can be accessed within the computing environment 500. In some embodiments, the storage 540 stores instructions for the software 580.

The input device(s) 550 may be a touch input device such as a keyboard, mouse, pen, trackball, touch screen, or game controller, a voice input device, a scanning device, a digital camera, or another device that provides input to the computing environment 500. The output device(s) 560 may be a display, printer, speaker, or another device that provides output from the computing environment 500.

The communication connection(s) 570 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 500, computer-readable media include memory 520, storage 540, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A method comprising:
at a server, receiving user profile information and faculty information of a user;
receiving, from a client device, a request for accessing a resource on the server;
generating a query based on the user profile information and the faculty information of the user, wherein the faculty information comprises faculties of the user obtained from the user during a registration process and the query is displayed on a touch sensitive display area of the client device, the query requiring a touch sensitive response on the touch sensitive display area of the client device;
receiving the touch sensitive response generated by the client device; and
authenticating the user if the touch sensitive response generated by the user matches a predefined response for the query stored on the server.

2. The method of claim 1, further comprising issuing a new query if the touch sensitive response generated by the user does not match the predefined response.

3. The method of claim 1, wherein the query instructs the user to draw at least one of objects, letters, and special characters on the touch sensitive display area.

4. The method of claim 1, wherein the query instructs the user to trace at least one object on the touch sensitive display area.

5. The method of claim 1, wherein the query instructs the user to color at least one object using a set of predefined colors displayed on the touch sensitive display area.

6. The method of claim 1, wherein the query instructs the user to indicate a particular part of a geographical map displayed on the touch sensitive display area.

7. The method of claim 1, wherein the query instructs the user to touch an object displayed on the touch sensitive display area of the client device.

8. The method of claim 1, wherein the query is contextually associated with an application currently executing on the client device.

9. The method of claim 1 wherein the query is presented visually to the user.

10. The method of claim 1 wherein the query is presented in the form of audio playback to the user.

11. The method of claim 1, further comprising generating a new query when the touch sensitive response generated by the user does not match the predefined response for the query.

12. The method of claim 1, further comprising the step of denying access to the resource on the server when, for a predefined number of attempts, the touch sensitive response generated by the user does not match the predefined response for the query.

13. The method of claim 1, further comprising the step of providing access to the resource on the server when the touch sensitive response generated by the user matches the predefined response for the query.

14. A system comprising:
   a client device comprising a touch sensitive display area, the touch sensitive display area configured to:
      display a query in response to receiving a request for accessing a resource on a server; and
      receive a touch sensitive response from a user; and
   a server, comprising:
      a storage module for storing user profile information;
      a query generation module for generating the query based on the user profile information and the faculty information of the user, wherein the faculty information comprises faculties of the user obtained from the user during a registration process; and
      an authentication module for comparing the touch sensitive response from the user with a predefined response for the query stored on the server.

15. The system of claim 14, wherein the query generation module issues a new query if the touch sensitive response from the user does not match the predefined response for the query.

16. The system of claim 14, wherein the query generation module generates a query that instructs the user to input at least one of objects, letters, and special characters on the touch sensitive display area.

17. The system of claim 14, wherein the query generation module generates a query that instructs the user to trace at least one object on the touch sensitive display area.

18. The system of claim 14, wherein the query instructs the user to indicate a particular part of a geographical map displayed on the touch sensitive display area.

19. The system of claim 14, wherein the query is contextually associated with the application currently executing on the client device.

20. The system of claim 14, wherein the authentication module denies access to the resource on the server when the touch sensitive response generated by the user does not match the predefined response for the query.

21. The system of claim 14, wherein the authentication module provides access to the resource on the server when the touch sensitive response generated by the user matches the predefined response for the query.

22. A computer program product for use with a computer, the computer program product comprising a computer usable medium having a computer readable program code embodied therein, the computer readable program code storing a set of instructions configured for:
   receiving user profile information and faculty information of a user;
   receiving, from a client device, a request for accessing a resource on the server;
   generating a query based on the user profile information and the faculty information of the user, wherein the faculty information comprises faculties of the user obtained from the user during a registration process and the query is displayed on a touch sensitive display area of the client device, the query requiring a touch sensitive response on the touch sensitive display area of the client device;
   receiving the response generated by the client device; and
   authenticating the user if the touch sensitive response generated by the user matches a predefined response for the query stored on the server.

23. The computer program product of claim 22, wherein the query generation module generates a query that instructs the user to input at least one of objects, letters, and special characters on the touch sensitive display area.

* * * * *